United States Patent [19]

Takano et al.

[11] Patent Number: 4,494,639
[45] Date of Patent: Jan. 22, 1985

[54] ELECTRO-MAGNETIC CLUTCH CONTROL SYSTEM FOR AUTOMOBILES

[75] Inventors: Toshio Takano, Hamuramachi; Ryuzo Sakakiyama, Tokyo, both of Japan

[73] Assignee: Fuji Jukogyo Kabushiki Kaisha, Tokyo, Japan

[21] Appl. No.: 265,117

[22] Filed: May 19, 1981

[30] Foreign Application Priority Data

Jul. 31, 1980 [JP] Japan .................................. 55-105717
Jul. 31, 1980 [JP] Japan .................................. 55-105718
Jul. 31, 1980 [JP] Japan .................................. 55-105720
Jul. 31, 1980 [JP] Japan .................................. 55-105721

[51] Int. Cl.³ ............................................. B60K 41/28
[52] U.S. Cl. ............................. 192/0.052; 192/0.076; 192/0.092
[58] Field of Search ................ 192/0.052, 0.07, 0.075, 192/0.076, 0.033, 0.092, 3.58, 103 R, 3.56

[56] References Cited

U.S. PATENT DOCUMENTS

| | | | |
|---|---|---|---|
| 2,914,131 | 11/1959 | Maurice et al. | 192/0.076 |
| 3,132,728 | 5/1964 | Chaptois | 192/0.07 |
| 4,081,065 | 3/1978 | Smyth et al. | 192/0.076 |
| 4,091,902 | 5/1978 | Hamada | 192/0.076 |

FOREIGN PATENT DOCUMENTS

| | | | |
|---|---|---|---|
| 0993631 | 6/1965 | United Kingdom | 192/3.56 |
| 0993632 | 6/1965 | United Kingdom | 192/3.56 |

Primary Examiner—George H. Krizmanich
Assistant Examiner—M. Manley
Attorney, Agent, or Firm—Martin A. Farber

[57] ABSTRACT

A system for controlling an electro-magnetic clutch of an internal combustion engine mounted on a car which is capable of controlling the clutch current after the gear-changing for providing the partial engagement of the clutch. The electro-magnetic clutch has a drive member secured to a crankshaft of the internal combustion engine, a driven member adjacent the drive member, which is coupled to a transmission of the car and a magnetizing coil provided in one of the members. A shift lever signal is provided during the operation of the shift lever of the transmission and an acceleration signal is provided according to the operation of the accelerator pedal of the car. A control circuit comprises a charging circuit operated by the shift lever signal, a standard voltage circuit responsive to the acceleration signal, and a comparator connected to the charging circuit and standard voltage circuit for producing an output signal for a period of time which is decided by the level of the acceleration signal. A gate circuit is operated by the output signal of the comparator for controlling the clutch current passing through the magnetizing coil.

2 Claims, 11 Drawing Figures

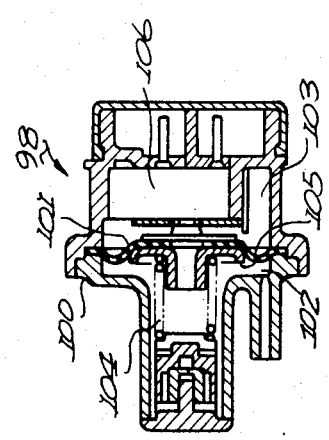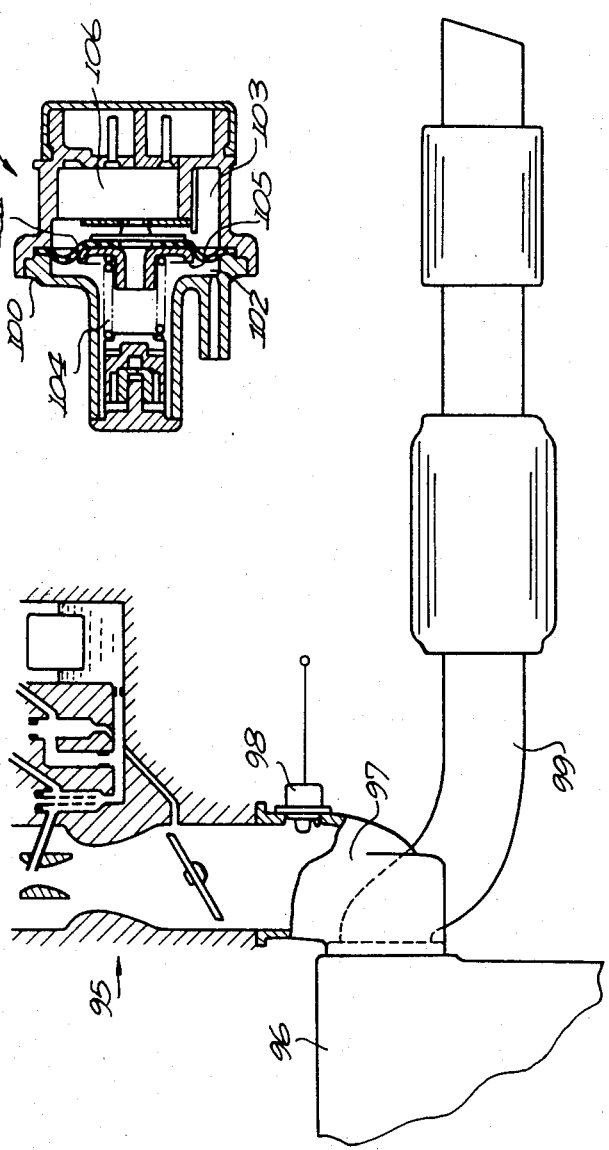

ELECTRO-MAGNETIC CLUTCH CONTROL SYSTEM FOR AUTOMOBILES

BACKGROUND OF THE INVENTION

The present invention relates to an electro-magnetic clutch control system, and more particularly to an electro-magnetic control system which is capable of diminishing the shock to the car body caused by the shifting gears in the transmission, as well as of minimizing the slipping of the electro-magnetic clutch during acceleration of the car.

The electro-magnetic clutch comprises an annular drive member secured to the crankshaft of an engine, a magnetizing coil provided in the drive member, a driven member secured to an input shaft of transmission spaced, leaving a small gap from the drive member, and a shift level for the shifting or changing of the gears in the transmission. The shift lever is provided with a switch for the magnetizing coil, which is actuated by operating the shift lever. When the shift lever is shifted to the gear engaging position, the switch is closed so that electric current flows through the magnetizing coil to magnetize the drive member. As the accelerator pedal is depressed, the current applied to the coil increases. The magnetic flux is aggregated in the gap between the drive member and the driven member, so that the driven member is coupled to the drive member. The clutch current passing through the magnetizing coil progressively increases according to the degree of depression of the accelerator pedal, while the clutch slips between the driven member and the driven member. Thus, the car may be smoothly and easily started by depressing the accelerator pedal without operating the clutch pedal. This is a well known technique.

However, in such a conventional electro-magnetic clutch, the driver of the car often gets an unpleasant shock sensation, if the clutch is immediately coupled after changing gears of the transmission. In a conventional control system, during a predetermined time after the completion of the gear-change, electric current smaller than a rated current is supplied to the coil of the clutch to put it in a partial engagement condition, that is the slipping condition. After the predetermined time, the clutch is completely connected, so that the shock of the connection of the clutch may be decreased. However, the clutch current and the control period for the partial-engagement condition are fixed to predetermined values. However, with a long slipping period due to the partial engagement during acceleration, especially during rapid acceleration, the driving feeling would not be so good. On the other hand, with a short slipping period during deceleration, a great shock would occur to the car body.

SUMMARY OF THE INVENTION

It is, therefore, a general object of this invention to provide an electro-magnetic clutch control system for automobiles, which comprises means for detecting the operating condition during gear-changing, means for controlling the clutch in order to vary the electric current for partially engaging the clutch and the period of the control time in dependency on the detection, thereby diminishing the shock, and reducing slipping of the clutch during acceleration.

According to the present invention, there is provided a system for controlling an electro-magnetic clutch of an internal combustion engine mounted on a car, which has a drive member secured to a crankshaft of said internal combustion engine a driven member adjacent said drive member, a magnetiziing coil provided in one of the members, a transmission secured to said driven member having a multi-stage change gears, comprising a first detecting means responsive to the operation of the gear changing for providing a gear-changing output signal; a second detecting means responsive to acceleration of said internal combustion engine for providing output signals; a first control circuit responsive to output signals of said first detecting means and second detecting means for producing an output signal for a period decided by the output signal of said second detecting means; first gate means responsive to the output signal of said first control circuit for producing an output signal; switch means responsive to the output signal of said first gate means to allow the current to flow said magnetizing coil, a second control circuit responsive to the output signal of said second detecting means for producing an output signal for decreasing the current passing through said magnetizing coil, and second gate means responsive to said output signal of said second control circuit for controlling said first gate means.

BRIEF DESCRIPTION OF DRAWINGS

FIG. 10 is a schematic illustration of another example of the acceleration sensing device; and FIG. 11 is a sectional view of the sensing device of FIG. 10.

DETAILED DESCRIPTION OF THE PREFERRED EMBODIMENTS

Figure 1:
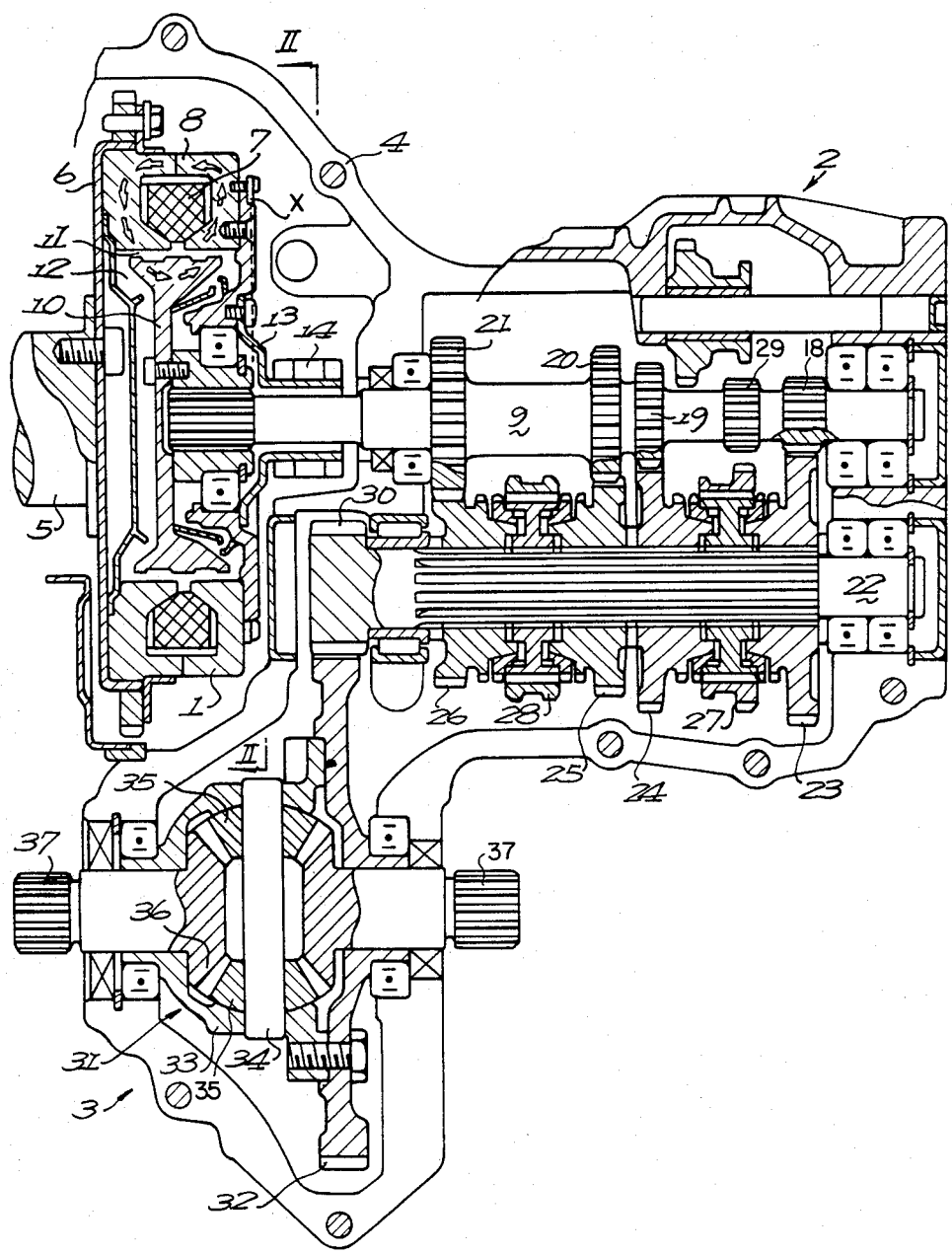
FIG. 1 is a cross-sectional view of an electro-magnetic powder clutch used in a system according to the present invention.
Figure 2:
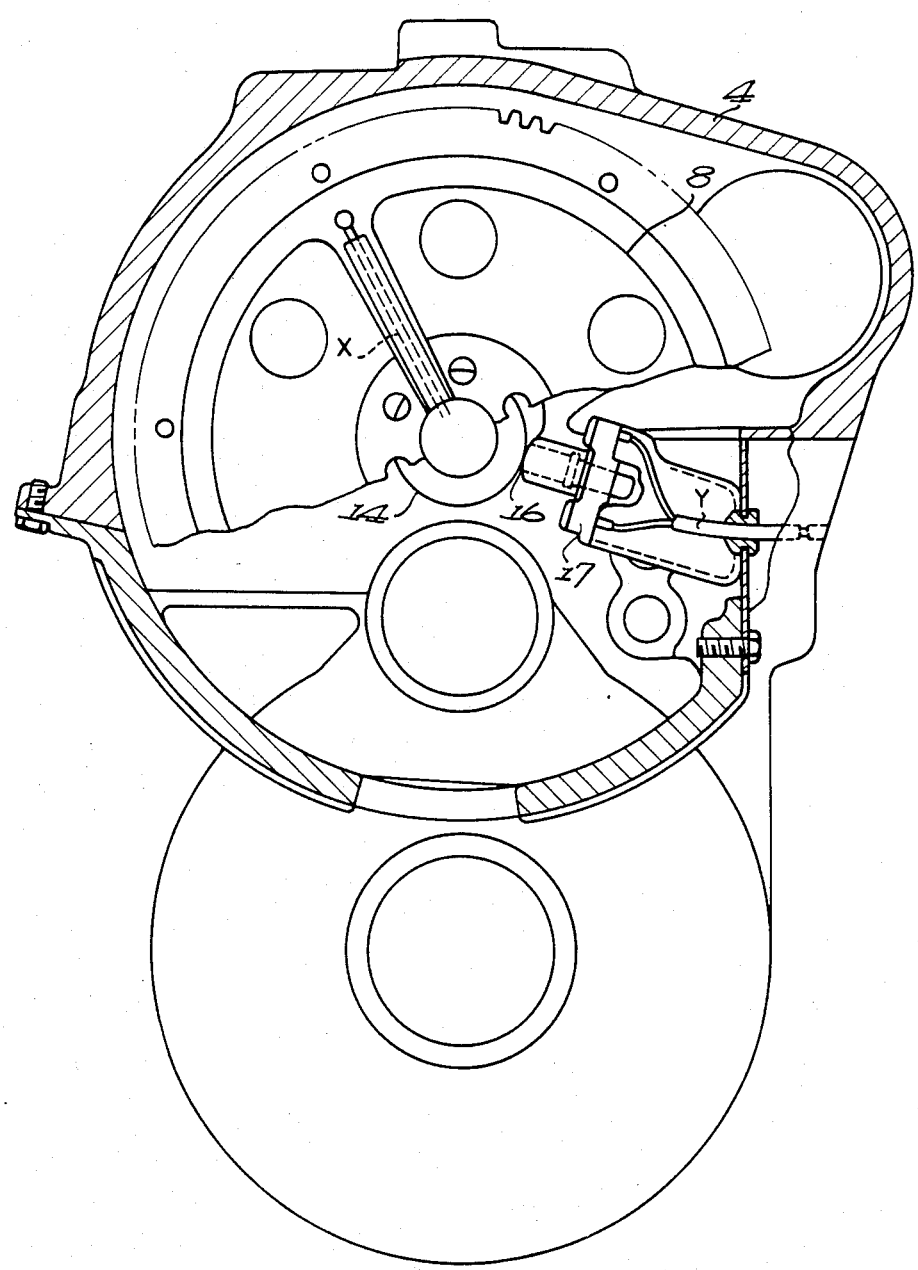
FIG. 2 is a cross-section taken along line II—II of FIG. 1.

Referring to FIG. 1 showing a transmission to which the present invention is applied, numeral 1 is an electro-magnetic powder clutch, 2 is a four-speed transmission and 3 is a final reduction device.

The electro-magnetic powder clutch 1 is provided in a clutch case 4 and comprises a drive plate 6 attached to the end of a crankshaft 5 of an internal combustion engine (not shown), an annular drive member 8 secured to the drive plate 6, a magnetizing coil 7 provided in the drive member 8, and a driven member 10 secured by a spline engagement to an input shaft 9 of the transmission 2, spaced, leaving a gap 11 from the drive member 8. Magnetic powder material is provided in a powder chamber 12 and the gap 11 is filled with the powder. A cap 13 is secured to the drive member 8. The cap 13 has a cylindrical portion coaxial with the input shaft 9, on which slip rings 14 are securely provided. Slip rings 14 are connected to the drive member 8 by a lead X. Brushes 16 (FIG. 4) press against the slip rings 14 and are supported in a holder 17 and connected to a hereinafter described control means by a lead Y.

In such a construction, the drive plate 6 and the drive member 8 rotate together with the crankshaft 5 and the magnetic powder sealed in the powder chamber 12 is drawn on the inner surface of the drive member 8 by centrifugal force. If the magnetizing coil 7 is excited by the current applied through the lead Y, the brushes 16, the slip rings 14 and the lead X, the drive member 8 is magnetized to produce a magnetic flux passing through the driven member 10 as shown by arrows in FIG. 1. Thus, the powder aggregates in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with the driven gears 23 to 26, respectively. The driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of the driven gears 25 and 26 can be engaged with the output shaft 22 by a synchromesh mechanism 28 in a well known manner. Further, a reverse drive gear means 29 is provided. Thus, by operating the shift level (not shown) of the transmission, the driven gear 23 is jointly rotatably coupled with the output shaft 22 by the synchromesh mechanism 27 and the 1st speed is obtained on the output shaft 22 because the power of output shaft 9 is greatly decreased. The 2nd, 3rd and 4th speed may be respectively obtained accordingly.

Further provided on an end of the output shaft 22 is an output gear 30 which engages with a ring gear 32 in a differential 31 of the final reduction device 3 to transmit the output of the output shaft 22 of the transmission 2 directly from ring gear 32 to side gear 36 through a case 33, a spider 34 and pinions 35, and further to driving wheels (not shown) through wheel shafts 37.

Figure 3:
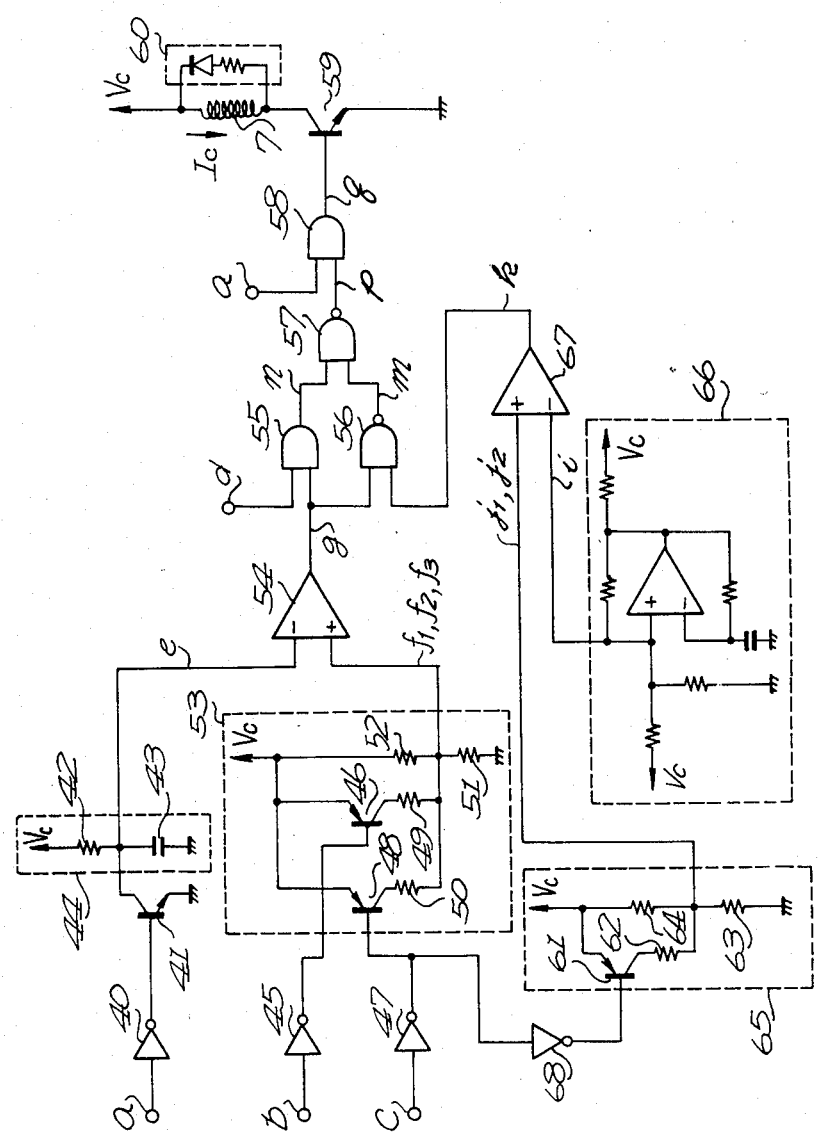
FIG. 3 is an electronic circuit showing an embodiment of the present invention.

FIG. 3 illustrates a construction of a control circuit of the present invention. Input signals comprise a gear-changing signal a produced during the operation of the shift lever, an acceleration signal b produced when the accelerator pedal is depressed, a clutch hold signal c produced when the accelerator pedal is depressed $\frac{1}{4}-\frac{1}{3}$ of its full depression angle, and a car speed signal d generated when the car speed exceeds a predetermined value. A clutch control signal is produced in accordance with the conditions of judging these signals a, b, c, d. The gear-changing signal a is applied through an inverter 40 to a base of a transistor 41, the emitter of which is grounded and the collector of which is connected to a charging circuit 44 consisting of a resistor 42 and a capacitor 43. The acceleration signal b is applied through an inverter 45 to a base of a transistor 46. The clutch hold signal c is applied through an inverter 47 to a base of a transistor 48. The collector of these transistors 46, 48 are connected through resistors 49, 50, respectively to one end of a resistor 51, the other end of which is grounded. The emitters of the transistors 46, 48 are connected to a positive electric source terminal Vc. A resistor 52 is connected between the positive electric source terminal and the resistor 51. The transistors 46, 48 and the resistors 49–52 form a standard voltage circuit 53. Both outputs from the charging circuit 44 and the standard voltage circuit 53 are connected to inputs of a comparator 54 which determines (decides) the duration of the clutch current. The output of the comparator 54 is connected to an AND gate 55 and a NAND gate 56. The other input of the AND gate 55 is applied with the car speed signal d. Both outputs from AND gate 55 and NAND gate 56 are connected to a NAND gate 57, the output of which is connected to AND gate 58. The other input of the AND gate 58 is applied with the gear-changing signal a, and the output of the AND gate 58 is connected to base of a transistor 59. The emitter of the transistor 59 is grounded and the collector of which is connected to one end of the coil 7. Further, both ends of the coil 7 are connected to a commutation circuit 60 comprising a diode and a resistor. The output of the inverter 47 is also connected through an inverter 68 to a base of a transistor 61. The collector of the transistor 61 is connected to resistors 62, 63 in series. The other end of the resistor 63 is grounded. The positive electric source terminal Vc is connected to the emitter of the transistor 61. A resistor 64 is connected to the positive electric source Vc and the resistor 63. The transistor 61, and resistors 62–64 form a standard voltage circuit 65. Numeral 66 designates a triangular wave generating circuit which comprises a comparator, resistors and a capacitor. The outputs from the standard voltage circuit 65 and the triangular wave generating circuit 66 are connected to inputs of a comparator 67, the output of which is connected to the other input of the NAND gate 56.

Figure 4:
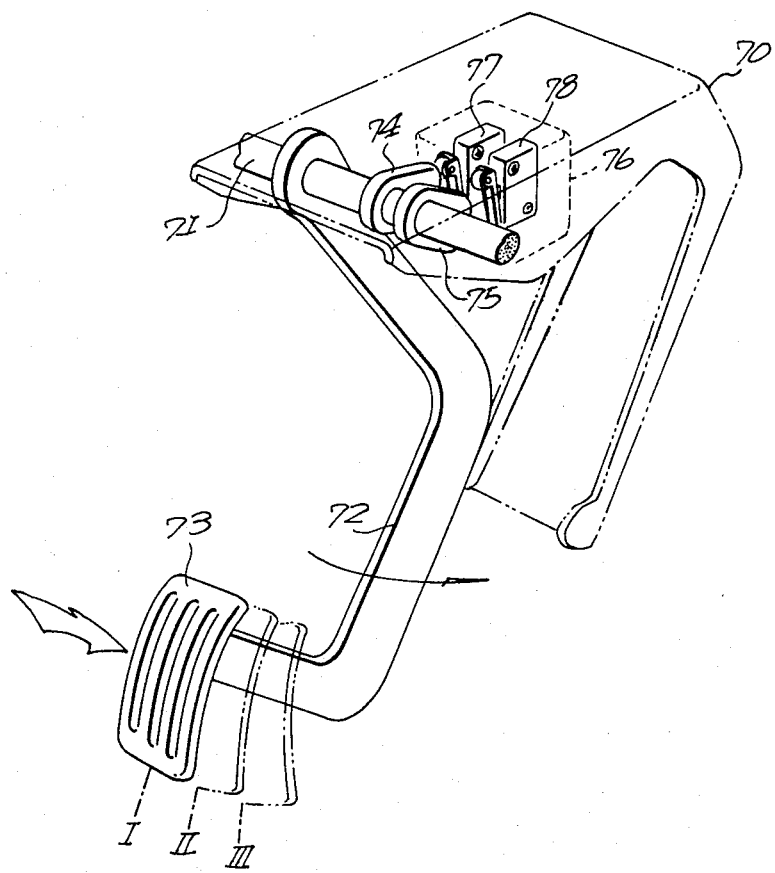
FIG. 4 is a perspective view showing the accelerator pedal and parts cooperating therewith.

As shown in FIG. 4, the accelerator mechanism comprises a bracket 70 made of metal sheet which is fixed to the car body, a shaft 71 rotatably supported on the bracket 70, a U-shaped arm 72 fixed to the shaft 71, and an accelerator pedal 73 mounted on the end of the arm 72. Further, a pair of cams 74, 75 spaced apart from each other are secured to the shaft 71 to face respectively an accelerator switch 77 and a clutch hold switch 78 provided in a supporting box 76.

The arm 72 is always biased in the clockwise direction by a spring (not shown) and is moved in the counter-clockwise direction by depressing the accelerator pedal 73. In FIG. 4, I indicates a stationary position when the accelerator pedal 73 is not depressed. When the accelerator pedal 73 is depressed to II position, the cam 74 engages the accelerator switch 77 to turn it on. When the accelerator pedal is depressed $\frac{1}{4}-\frac{1}{3}$ of the entire stroke, the cam 75 engages the clutch hold switch 78 to turn it on.

Operation of the system will be hereinafter described.

The gear-changing signal a is at a low level during the operation of the shift lever of the transmission; the acceleration signal b is at a low level only when the accelerator pedal 73 is depressed to the position II in FIG. 4 to make the contact of the accelerator switch 77; and the clutch hold signal c is at a low level only when the accelerator pedal 73 is depressed further to the position III in FIG. 4 to make the contact of the clutch-hold switch 78; and the car speed signal d is at a high level only when the car speed exceeds a predetermined speed, for example 15 Km/h.

Gear-changing at a speed higher than a predetermined speed without depressing the accelerator pedal 73 (for deceleration)

Here each of the accelerator signal b, the clutch hold signal c, and the car speed signal d is at a high level.

Signals b and c are inverted to low level signals by the inverters 45, 47 to turn on the transistors 46, 48 so that a high level standard signal $f_1$ determined by the resistors 49–52 is applied to the comparator 54. A low level signal from the inverter 47 is inverted to a high level signal by the inverter 68, turning off the transistor 61, so that a low level standard signal $j_1$ is applied to the comparator 67. When the transmission is actuated under such a condition, the gear-changing signal s is changed from a high level to a low level, which is inverted to a high level by the inverter 40 to turn on the transistor 41. Therefore, the capacitor 43 of the charging circuit 44 discharges until the output of the charging circuit 44 drops to a low level. The comparator 54 compares the signal e from the charging circuit 44 with the signal $f_1$ from the standard voltage circuit 53. The output signal g of the comparator 54 is high, when the signal e is lower than the signal $f_1$. In other words, the duration of the output signal g in a high level is decided by the level of the signal $f_1$. When the high level signal g is supplied to the AND gate 55, the output n of the AND gate 55 goes to a high level because the car speed signal d is at a high level. The comparator 67 is applied with a triangular wave signal i from the triangular wave generating circuit 66 and with a standard signal $j_1$ from the standard voltage circuit 65. The comparator 67 produces a high level signal only when the standard signal $j_1$ is higher than the triangular wave signal i, so that a pulse train k illustrated by the solid line is applied to the NAND gate 56. The NAND gate 56 is supplied with the high level signal g from the comparator 54 to produce a pulse train in a waveform m which comprises inverted pulses of pulses k. The NAND gate 57 produces a pulse train in a waveform p according to signals n and m. However, since the level of the gear-changing signal a is low, the output of the AND gate 58 g is at a low level. Therefore, the transistor 59 is in the cut-off state, so that the clutch current does not flow through the coil 7. Thus, the gear-changing can be done.

When the gear-changing operation is accomplished, the gear-changing signal a goes to a high level. The AND gate 58 produces pulses g according to the pulses in the waveform p, turning on and off the transistor 59 so as to send periodical electric current through the coil 7. Thus, the periodical electric current flowing through the coil 7 provides a partial engagement of the clutch and the electro-magnetic powder clutch 1 transmits the torque with slipping of the driven member 10.

When the level of the gear-changing signal a is changed from low to high, the output of the inverter 40 turns off the transistor 41, thereby to charge the capacitor 43 through the resistor 42. Thus, the voltage of the signal e from the charging circuit 44 increases gradually. When the voltage becomes higher than the signal $f_1$ from the standard voltage circuit 53, the output of the comparator 54 goes to a low level at r. Consequently, the output n of the AND gate 55 goes to a low level and the output p of the NAND gate 57 changes to the high level. The output g of the AND gate 58 goes to the high level to turn on the transistor 59 and to allow the current to flow through the coil 7. Thus, the electro-magnetic powder clutch 1 is completely coupled. The variation of the cluch current Ic passing through the coil 7 is shown by a waveform u.

Gear-changing at a speed higher than the predetermined car speed, and acceleration by slightly depressing the accelerator pedal 73

Here the level of the acceleration signal b is low; the level of the clutch hold signal c is high; thus the transistors 46, 61 are turned off; and the transistor 48 is turned on. Thus, the standard voltage circuit 53 produces an output standard signal of middle level $f_2$, which is lower than the standard signal $f_1$. Further, because the transistor 61 is turned off, the standard signal $j_1$ does not vary and the comparator 67 produces output pulse k illustrated by the solid line. Consequently, signal g changes from the high level to the low level at s when the charging signal e coincides with the standard signal $f_2$. The time s is earlier than the above mentioned time r when the signal g changes under the non-depressed condition of the accelerator pedal, thereby decreasing the period of the partial engagement of the clutch. The variation of the clutch current Ic is illustrated by the curve v.

Gear-changing at a speed high than the predetermined car speed and acceleration by greatly depressing the accelerator pedal Here the levels of the acceleration signal b and the clutch hold signal c are low, thus, the transistors 46, 48 are turned off, and the transistor 61 is turned on. Thus, the standard signal from the standard voltage circuit 53 changes to a low level signal $f_3$, and the standard signal from the standard voltage circuit 65 is a high level signal $j_2$. The time when the output g of the comparator 54 goes to a low level by the standard signal $f_3$ is at the time t after the level of the gear-changing signal a becomes high. Thus, the slipping period is shortened more. Further, because of the high electric potential of the standard signal $j_2$, the pulse width of the signal k sent from the comparator 67 increases as illustrated by the dashed line. This causes an increase in the pulse width of the pulse of the signal g, thereby increasing the period while the transistor 59 is turned on. Thus, the clutch current for the partial engagement increases. Thus, the clutch current Ic varies as illustrated by the line w which shows the shortened partial engagement period and the greater clutch current for partial engagement of the clutch compared with the above-described other operating conditions.

Figure 6:
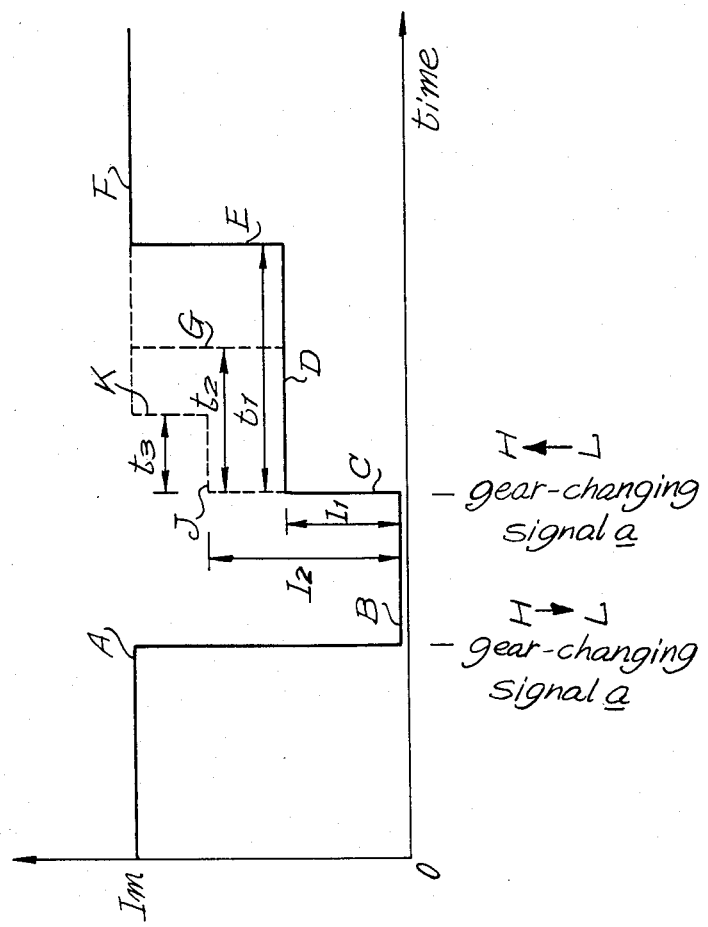
FIG. 6 is a graph illustrating the variation of clutch current.

FIG. 6 shows the control of the clutch current by the aforementioned signals a, b, c and d. When the car is driven in a steady condition without gear-changing,, the clutch current Im flows regularly as shown by the line A. When the gear-changing signal a changes from a high level to a low level, the clutch current goes to zero as illustrated by the line B. When the signal a changes from a low level to a high level after completing the gear-changing operation, the clutch current increases as illustrated by the line C providiing the partial engagement condition. During the deceleration, the current for the partial engagement $I_1$ flows during the time $t_1$ and during acceleration, the clutch current $I_1$ flows during the time $t_2$. After that, the regular current Im flows as shown by the line F at the time E or G so as to complete a clutch control operation series. During rapid acceleration, the clutch current $I_2$ flows during the shorter period $t_3$, varying stepwise in the order of C→J→K.

Thus, in this system, the partial engagement condition of the clutch can be varied in three stages in accordance with the degree of depression of the accelerator pedal 73, which provides a sensitive control in response to the operational condition. Although the accelerator pedal 73 is used to vary the clutch current, it is also possible to obtain the same effect by employing an electrical detector for detecting the opening degree of the throttle valve of the carburetor or the negative pressure in the intake passage of the engine.

Figure 5:
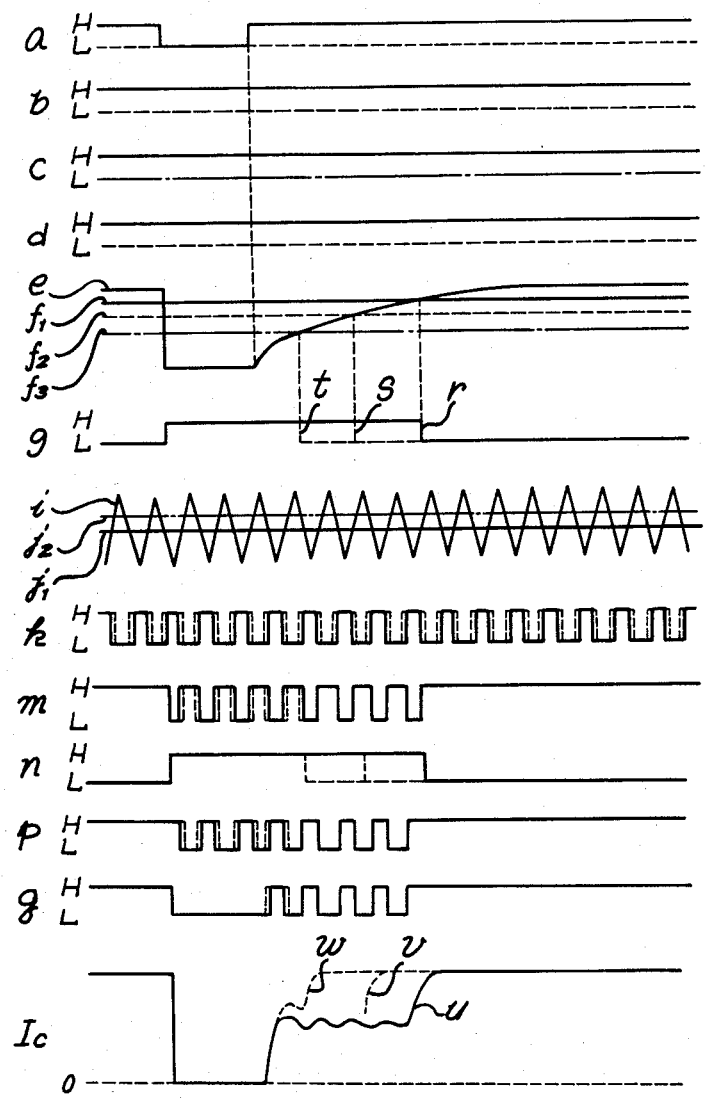
FIG. 5 is a timing chart illustrating the variation of signals located at portions in FIG. 3.
Figure 7:
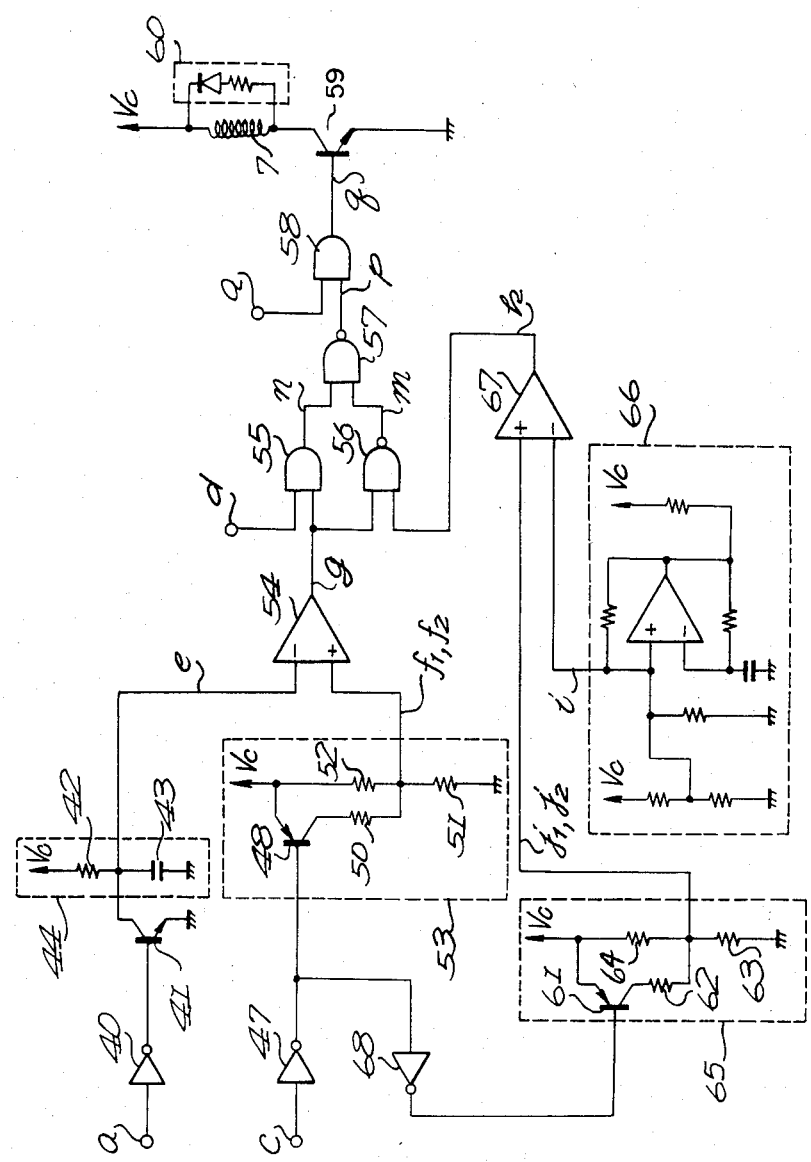
FIG. 7 is an electronic circuit showing another embodiment of the present invention.

In the system illustrated in FIG. 3, the circuit relative to the acceleration signal b may be omitted. FIG. 7 shows such a modification. As shown in FIG. 7, the inverter 45, the transistor 46 and the resistor 49 in the previous embodiment are removed from the circuit. Other parts are the same as the system of FIG. 3. Although the system does not include the control operation by the clutch current v in FIG. 5, an effect similar to that of the system of FIG. 3 may be obtained.

Figure 8:
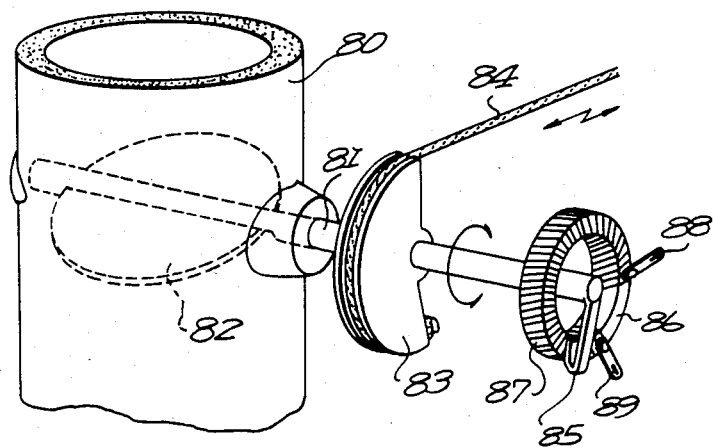
FIG. 8 is a perspective view showing an example of an acceleration sensing device.

FIG. 8 shows another example of an acceleration sensing device. The device is provided on a throttle shaft 81 of a throttle valve 82 provided in an intake passage 80. Secured to the throttle shaft 81 is a semi-circular drum 83 with an accelerator cable 84. A potentiometer is provided on the end of the throttle shaft 81. The potentiometer comprises a sliding contact 85, and a resistor 87 wound on a periphery of a ring 86. This ring 86 is made of insulating material such as plastic and located coaxially to the throttle shaft 81. Terminals 88, 89 are fixed to the ring 86 and connected with both ends of resistor 87 respectively.

Figure 9:
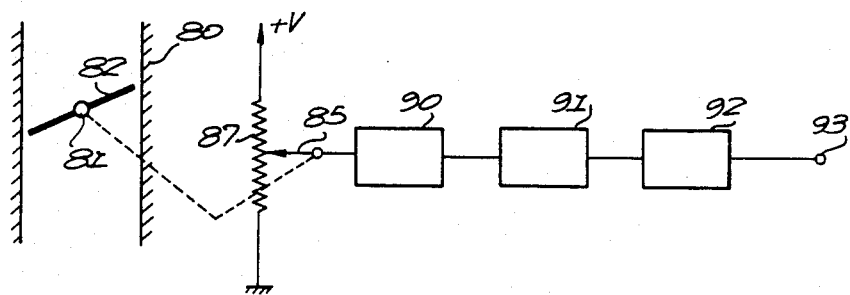
FIG. 9 is a block diagram showing a system for producing an output signal from the signal produced by the device of FIG. 8.

FIG. 9 shows a circuit processing the signals from FIG. 8. The sliding contact 85 is connected to an amplifier 90, which is in turn connected to a judging circuit 92 through a differentiating circuit 91.

The operation of this embodiment will be explained hereinafter. The throttle shaft 81 is biased by a spring (not shown) in the counter-clockwise direction in FIG. 8. When the accelerator cable 84 is pulled by depressing the accelerator pedal, the drum 83 is rotated in the clockwise direction to rotate the throttle shaft 81 together with the throttle valve 82. The sliding contact 85 rotates together with the throttle shaft 81, sliding on the resistor 87, which causes the variation of voltage applied to the amplifier 90. The voltage applied to and amplified by the amplifier 90 is sent to the differentiating circuit 91 where the variation of the voltage is differentiated. The judging circuit 92 produces an output 93 in response to the output of the differentiating circuit 91 at the acceleration. The output 93 of the judging circuit 92 is used as the clutch hold signal c.

FIG. 10 shows a further example of the acceleration detecting means which is provided with a vacuum switch 98 on an intake passage 97 of an engine 96. The vacuum switch 98 is operated by the negative pressure of the air-fuel mixture supplied by a carburetor 95. Numeral 99 designates an exhaust pipe of the engine 96. FIG. 11 shows the inside of the vacuum switch 98. The cylindrical hollow body 100 is divided air-tightly by a diaphragm 101 into a pressure chamber 102 and a switch chamber 103. The pressure chamber 102 communicates with the intake passage 97 and the switch chamber 103 communicates with the atmosphere. Further, the pressure chamber 102 has a coil spring 104 and an actuating member 105 secured to the diaphragm 101, and the switch chamber 103 has a micro-switch 106 which is actuated by the diaphragm 101. When the negative pressure in the intake passage 97 is low (when the accelerator pedal is depressed), the difference between the pressures in the pressure chamber 102 and in the switch chamber 103 is small. Accordingly, the coil spring 104 actuates the actuation member 105 to push and turn on the micro-switch 106. When the negative pressure is high (when the accelerator pedal is released), the pressure difference is large, so that the diaphragm is deflected against the coil spring 104 causing the micro-switch 106 to turn off. Therefore, the condition of the micro-switch 106 may be assumed to be a signal for detecting the acceleration. Thus, the output signal from the micro-switch 106 is sent to the input c of FIG. 3 to provide the same actuation as the clutch hold switch 78.

Being thus constructed, the present invention provides a clutch control system which may diminish the shock caused by a rapid engagement of the clutch upon acceleration, and minimize slipping of the clutch upon rapid acceleration to reduce unpleasantness for the driver.

What is claimed is:

1. A system for controlling an electro-magnetic clutch of an internal combustion engine mounted on a car, which has a drive member secured to a crankshaft of said internal combustion engine, a driven member adjacent said drive member, a magnetizing coil provided in one of said members, a transmission secured to said drive member having multi-stage change gears, comprising a first detecting means responsive to the operation of said change gears for producing a gear-changing output signal, a second detecting means responsive to the acceleration of said internal combustion engine for providing output signals, a first control circuit responsive to output signals of said first detecting means and second detecting means for producing an output signal for a period decided by the output signal of said second detecting means, a first gate means responsive to the output signal of said first control circuit fo producing an output signal, switch means responsive to the output signal of said first gate means to allow the current to flow to said magnetizing coil, a second control circuit responsive to the output signal of said second detecting means for producing an output signal for decreasing the current passing through said magnetizing coil, second gate means responsive to said output signal of said second control circuit for controlling said first gate means, and said second control circuit comprises a standard voltage circuit, a triangular wave generating circuit, and a comparator means for comparing outputs of said standard voltage circuit and said triangular wave generating circuit for producing a pulse train having a pulse width decided by the level of the output signal of said standard voltage circuit.

2. A system for controlling an electro-magnetic clutch of an internal combustion engine mounted on a car, which has a drive member secured to a crankshaft of said internal combustion engine, a driven member adjacent said drive member, a magnetizing coil provided in one of said members, a transmission secured to said driven member having multi-stage change gears, comprising a first detecting means responsive to the operation of said change gears for producing a gear-changing output signal, a second detecting means responsive to the acceleration of said internal combustion engine for providing output signals, a first control circuit responsive to output signals of said first detecting means and second detecting means for producing an output signal for a period decided by the output signal of said second detecting means, first gate means responsive to the output signal of said first control circuit for producing an output signal, switch means responsive to the output signal of said first gate means to allow the current to flow to said magnetizing coil, a second control circuit responsive to the output signal of said second detecting means for producing an output signal for decreasing the current passing through said magnetizing coil, second gate means responsive to said output signal of said second control circuit for controlling said first gate means, said first control circuit comprises a charging circuit, a first standard voltage circuit, and a comparator for comparing output signals of said charging circuit and first standard voltage circuit for producing an output signal for a period decided by the level of the output signal of said first standard voltage circuit, and said second control circuit comprises a second standard voltage circuit, a triangular wave generating circuit, and a comparator means for comparing outputs of said second standard voltage circuit and said triangular wave generating circuit for producing a pulse train having a pulse width decided by the level of the output signal of said second standard voltage circuit.

* * * * *